US008473950B2

(12) United States Patent
Flood et al.

(10) Patent No.: US 8,473,950 B2
(45) Date of Patent: Jun. 25, 2013

(54) PARALLEL NESTED TRANSACTIONS

(75) Inventors: Christine H. Flood, Westford, MA (US); Victor M. Luchangco, Cambridge, MA (US); Jan-Willem Maessen, Somerville, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1037 days.

(21) Appl. No.: 12/490,287

(22) Filed: Jun. 23, 2009

(65) Prior Publication Data

US 2010/0325630 A1    Dec. 23, 2010

(51) Int. Cl.
G06F 9/46 (2006.01)
G06F 17/00 (2006.01)

(52) U.S. Cl.
USPC ............................ 718/101; 718/106; 707/703

(58) Field of Classification Search
None
See application file for complete search history.

(56) References Cited

U.S. PATENT DOCUMENTS

| | | | | |
|---|---|---|---|---|
| 2007/0162520 A1* | 7/2007 | Petersen et al. | ............... | 707/202 |
| 2009/0031310 A1* | 1/2009 | Lev et al. | ...................... | 718/101 |
| 2010/0162247 A1* | 6/2010 | Welc et al. | .................... | 718/101 |

OTHER PUBLICATIONS

Herlihy, M., Luchangco, V., and Moir, M., A Flexible Framework for Implementing Software Transactional Memory, OOPSLA '06, Oct. 22-26, 2006, 9 pages.
Agrawal, K., Fineman, J. T., and Sukha, J., Nested Parallelism in Transactional Memory, PPoPP '08, Feb. 20-23, 2008, 12 pages.

* cited by examiner

*Primary Examiner* — Meng An
*Assistant Examiner* — Caroline H Arcos
(74) *Attorney, Agent, or Firm* — Osha Liang LLP

(57) ABSTRACT

A system for managing transactions, including a first reference cell associated with a starting value for a first variable, a first thread having an outer atomic transaction including a first instruction to write a first value to the first variable, a second thread, executing in parallel with the first thread, having an inner atomic transaction including a second instruction to write a second value to the first variable, where the inner atomic transaction is nested within the outer atomic transaction, a first value node created by the outer atomic transaction and storing the first value in response to execution of the first instruction, and a second value node created by the inner atomic transaction, storing the second value in response to execution of the second instruction, and having a previous node pointer referencing the first value node.

15 Claims, 13 Drawing Sheets

PARALLEL NESTED TRANSACTIONS

BACKGROUND

As the number of processing cores per computer increases, concurrent computing is becoming more and more prevalent. In order to make the programming of concurrent computers easier, memory associated with the cores is shared. However, sharing memory poses problems, such as different cores or threads simultaneously attempting to access the same location in memory. Moreover, ensuring that separate threads do not update the same location in memory at the same time is complicated and error prone.

SUMMARY

In general, in one aspect, the invention relates to a system for managing transactions. The system includes a first reference cell associated with a starting value for a first variable, a first thread, executing on a processor, comprising an outer atomic transaction having a first instruction to write a first value to the first variable, a second thread, executing in parallel with the first thread, comprising an inner atomic transaction having a second instruction to write a second value to the first variable, wherein the inner atomic transaction is nested within the outer atomic transaction. The system further includes a first value node created by the outer atomic transaction and storing the first value in response to execution of the first instruction, and a second value node created by the inner atomic transaction, storing the second value in response to execution of the second instruction, and comprising a previous node pointer referencing the first value node, wherein the first reference cell comprises a first node pointer referencing the second value node.

In general, in one aspect, the invention relates to a method for managing transactions. The method involves executing an outer atomic transaction comprising a first instruction to write a first value to a first variable, wherein the outer atomic transaction is part of a first thread executing on a processor, executing, in parallel with the outer atomic transaction, an inner atomic transaction comprising a second instruction to write a second value to the first variable, wherein the inner atomic transaction is nested within the outer atomic transaction, and wherein the inner atomic transaction is part of a second thread. The method also involves committing the inner atomic transaction, wherein the first value is visible to the outer atomic transaction after committing the inner atomic transaction, and committing the outer atomic transaction after committing the inner atomic transaction.

In general, in one aspect, the invention relates to a method for managing transactions. The method involves executing an outer atomic transaction comprising a first instruction associated with a variable, wherein the outer atomic transaction is part of a first thread executing on a processor, executing, in parallel with the outer atomic transaction, an inner atomic transaction comprising a second instruction associated with the variable, wherein the inner atomic transaction is part of a second thread, and wherein the inner atomic transaction is nested within the outer atomic transaction, and aborting execution of the inner atomic transaction and the outer atomic transaction to execute a non-transactional access, wherein the non-transactional access comprises a third instruction to write a starting value to the variable. The method further involves executing the first thread and the second thread after executing the non-transactional access, wherein the first instruction comprises reading the starting value from the variable and writing a first value based on the starting value to the variable, and wherein the second instruction comprises writing a second value to the variable, committing the inner atomic transaction, wherein the second value is visible to the outer atomic transaction after committing the inner atomic transaction, and committing the outer atomic transaction after committing the inner atomic transaction.

Other aspects of the invention will be apparent from the following description and the appended claims.

DETAILED DESCRIPTION

Figure 1:
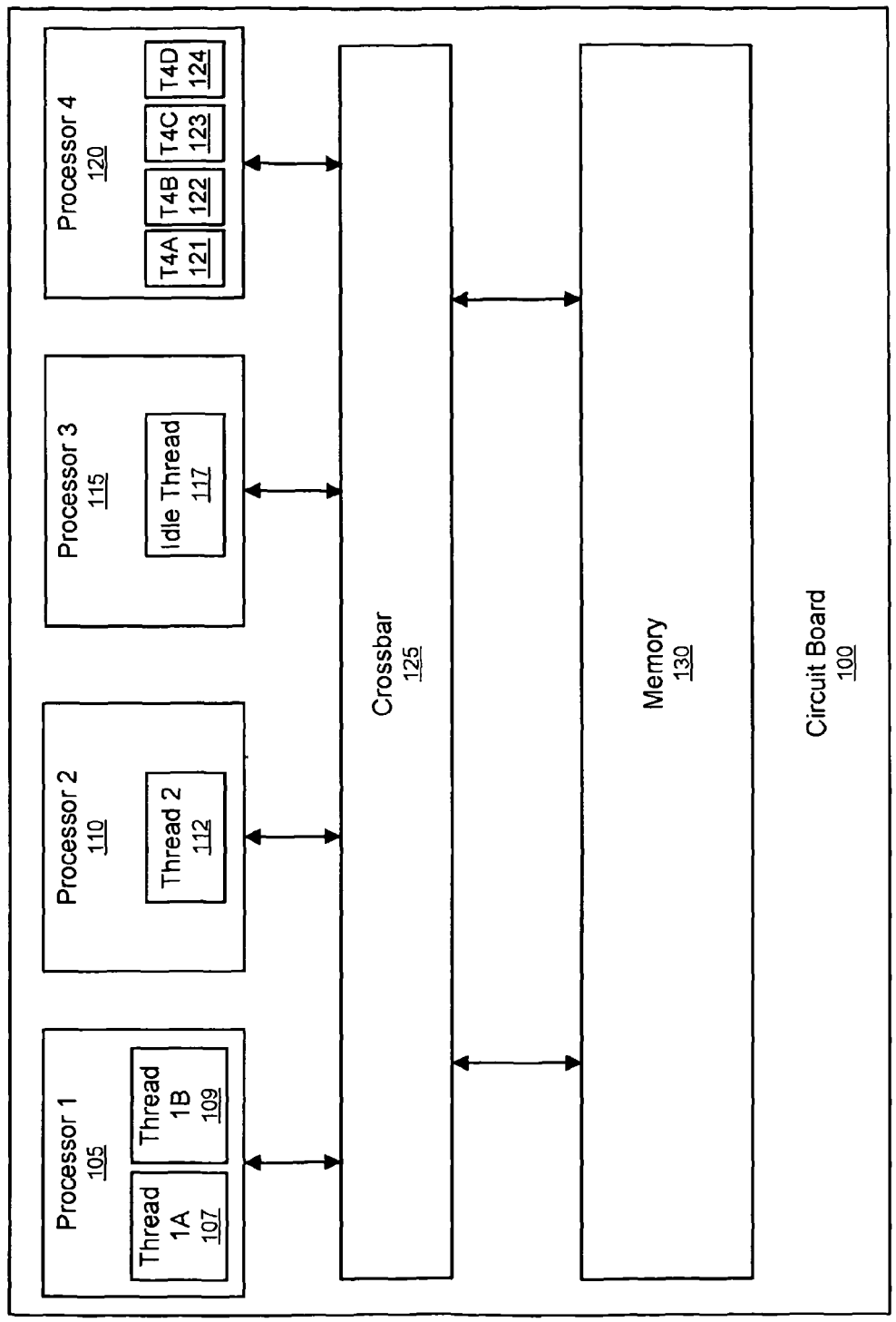
FIG. 1 shows a circuit board in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for executing nested atomic transactions in parallel. Each of the atomic transactions may include instructions to access a variable (i.e., a memory location), and each variable may be referenced/identified by a reference cell. An inner atomic transaction having an instruction to write a new value to the variable may both create a value node storing the new value and link the value node to the corresponding reference cell using pointer(s). An outer atomic transaction may access the new value and possibly modify the new value after the inner atomic transaction commits. However, the new value and/or modifications performed on the new value by the outer atomic transaction may only be available to non-transactional accesses and unrelated atomic transactions after the outer atomic transaction commits.

FIG. 1 shows a circuit board (100) in accordance with one or more embodiments of the invention. It will be apparent to one of ordinary skill in the art that circuit boards may be set up in many different ways and as such, the invention should not be limited to the example shown in FIG. 1. As shown in FIG. 1, circuit board (100) has multiple components including multiple processors (i.e., Processor 1 (105), Processor 2 (110), Processor 3 (115), Processor 4 (120)), Crossbar (125), and Memory (130). The individual components of the circuit board (100) are discussed below.

A thread is a series of instructions, including instructions to access a memory location (i.e., read a value from the memory location, write a value to the memory location), for execution by a processor (e.g., Processor 1 (105), Processor 2 (110), Processor 3 (115), and Processor 4 (120)). Further, multiple threads may be executed simultaneously. As shown in FIG. 1, Processor 1 (105) is executing Thread 1A (107) and Thread 1B (109). Processor 2 (110) is executing Thread 2 (112). Processor 3 (115) is executing Idle thread (117). Processor 4 (120) is executing Thread 4A (121), Thread 4B (122), Thread 4C (123), and Thread 4D (124). In one or more embodiments of the invention, each processor is a different core on a multi-core processor. Alternatively, each processor may be a separate processor on a circuit board. In one or more embodiments of the invention, multiple circuit boards may be used with varying numbers of processors.

FIG. 1 also includes crossbar (125). The crossbar (125) may be a component of circuit board (100) that enables communication between the processors (i.e., Processor 1 (105), Processor 2 (110), Processor 3 (115), and Processor 4 (120)) and memory (130). The memory (130) may be any kind of memory or storage. In one or more embodiments of the invention, the memory (130) is cache memory, such as a L1 or L2 cache. In another embodiment, the memory (130) may be random access memory (RAM, virtual memory, or some combination/configuration of one or more different forms of memory.

Figure 2:
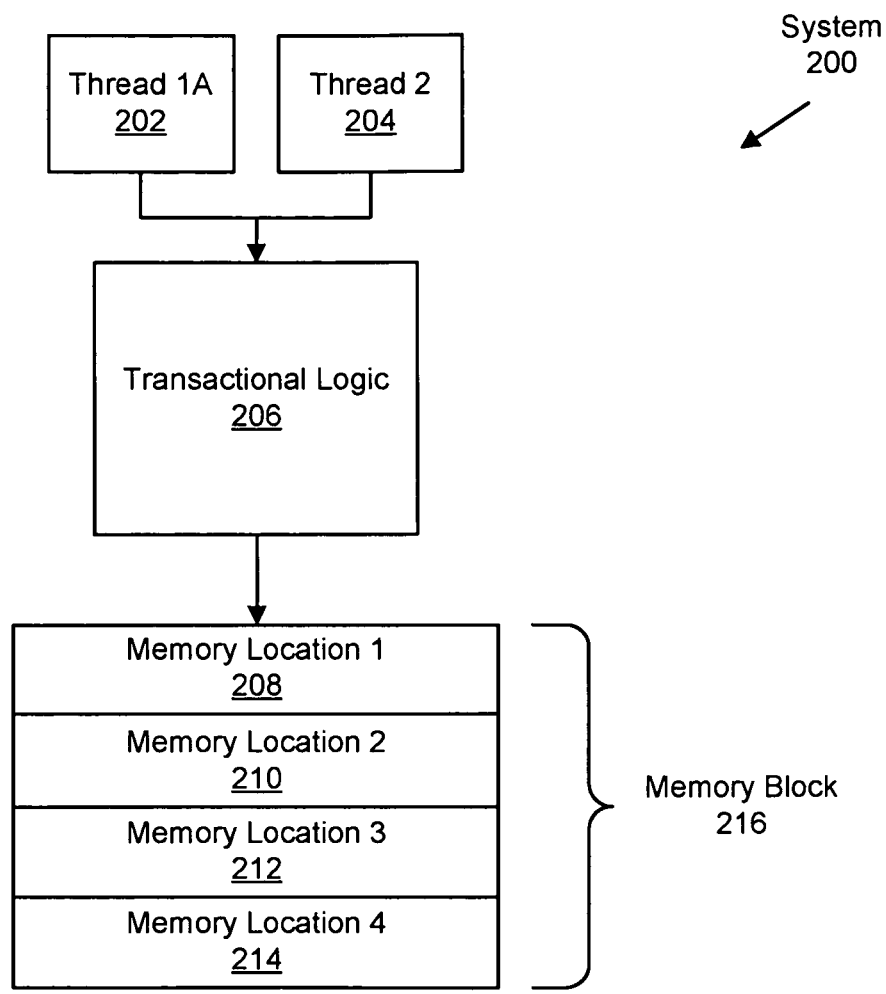
FIG. 2 shows a system in accordance with one or more embodiments of the invention.

FIG. 2 shows a system in accordance with one or more embodiments of the invention. The system (200) includes Thread 1A (202), Thread 2 (204), transactional logic (206), and memory block (216). The memory block (216) is partitioned into individual memory locations 1 through 4 (208, 210, 212, and 214, respectively). The memory block (216) may be essentially the same as memory (130) in FIG. 1. In one or more embodiments of the invention, the memory block (216) may be a portion of the available memory. In one or more embodiments of the invention, each memory location (208, 210, 212, 214) of the memory block (216) may be a different size and each memory location may be accessed individually by its address (not shown). It will be apparent to one of ordinary skill in the art that there may be more than one memory block, as well as more than four memory locations, and as such the invention should not be limited to the example of FIG. 2.

In one or more embodiments of the invention, Thread 1A (202) and Thread 2 (204) are essentially the same as the identically named threads of FIG. 1. Further, Thread 1A (202) and Thread 2 (204) may include instructions for reading values from and/or writing values to one or more locations in the memory block (216). In one or more embodiments of the invention, Thread 1A (202) and Thread 2 (204) access the same memory location sequentially. In one or more embodiments of the invention, Thread 1A (202) and Thread 2 (204) execute in parallel and include instructions for accessing the same memory location(s).

In one or more embodiments of the invention, the transactional logic (206) is a layer of computer readable code executing between the memory block (216) and any thread (202, 204) attempting to access memory locations in the memory block. Specifically, the transactional logic (206) includes a contention manager (not shown) for resolving conflicting attempts by multiple threads (202, 204) to access one or more memory locations. Accordingly, the contention manager may dictate which thread is initially granted access to a memory location and which thread is initially denied access to the same memory location when a conflict exists. It will be apparent to one of ordinary skill in the art that although Thread 1A (202), Thread 2 (204), and the transactional logic (206) are depicted as being outside the memory block (216), these components may also reside in the memory block (216).

In one or more embodiments of the invention, an atomic transaction is a group of instructions intended to be executed together. In other words, the outputs/results of the instructions (e.g., updates to memory locations) are not accessible to instructions outside the atomic transaction until after the atomic transaction is successfully executed. In one or more embodiments of the invention, an atomic transaction may be executed using a single thread. Alternatively, an atomic transaction may be executed using multiple threads. In one or more embodiments of the invention, atomic transactions are implemented using additional data structures to temporarily hold a new value generated by the instructions of the atomic transaction for a memory location. Once execution of the atomic transaction is complete, the existing value in the memory location is replaced by the new value, and the new value becomes visible to instructions outside the atomic transaction. In other words, regardless of how many different values are generated for a memory location by the instructions of an atomic transaction, only the final value will be viewable by instructions outside the atomic transaction (i.e., no intermediate state of the memory location is visible).

Further, atomic transactions may be nested. In other words, one atomic transaction (i.e., an inner or child atomic transaction) may exist entirely within another atomic transaction (i.e., an outer or parent atomic transaction). During execution, the inner atomic transaction must commit (i.e., complete execution) before the outer atomic transaction can commit. Atomic transactions may nest to any number of levels (e.g., parent atomic transactions, child atomic transactions, grandchild atomic transactions, great-grandchild atomic transactions, etc.). Further, there may be any number of atomic transactions within a given level (i.e., any number of sibling transactions).

In one or more embodiments of the invention, atomic transactions may execute in parallel. For example, a parent atomic transaction may execute in parallel with a child atomic transaction. As another example, multiple sibling atomic transactions may execute in parallel. In one or more embodiments of the invention, atomic transactions may execute in parallel no matter how many siblings exist, and no matter how deeply the atomic transactions are nested. Further, multiple atomic transactions may execute in parallel even when each of the multiple atomic transactions include instructions to modify the same memory location(s).

In contrast, a group of instructions for accessing a memory location may execute outside of an atomic transaction (i.e., non-transactional accesses). Following the execution of each instruction in the group, the result of executing the instruction is visible to both other instructions within the group and instructions outside the group, even though all instructions within the group have not yet been executed. For example, consider the existence of (i) an atomic transaction for incrementing a variable from 0 to 3 by repeatedly adding one to the previous value of the variable; and (ii) a group of instructions outside an atomic transaction for incrementing a variable from 0 to 3 by repeatedly adding one to the previous value of the variable. In the case of (ii) (i.e., non-transactional accesses), instructions outside the group could read the intermediate values of the variable (i.e., 0, 1, 2, and 3). However, in the case of (i), an instruction outside the atomic transaction would continue to read the variable as 0 until the atomic transaction completed. Once the atomic transaction completed, an instruction outside the atomic transaction would read the variable as 3.

Figure 3:
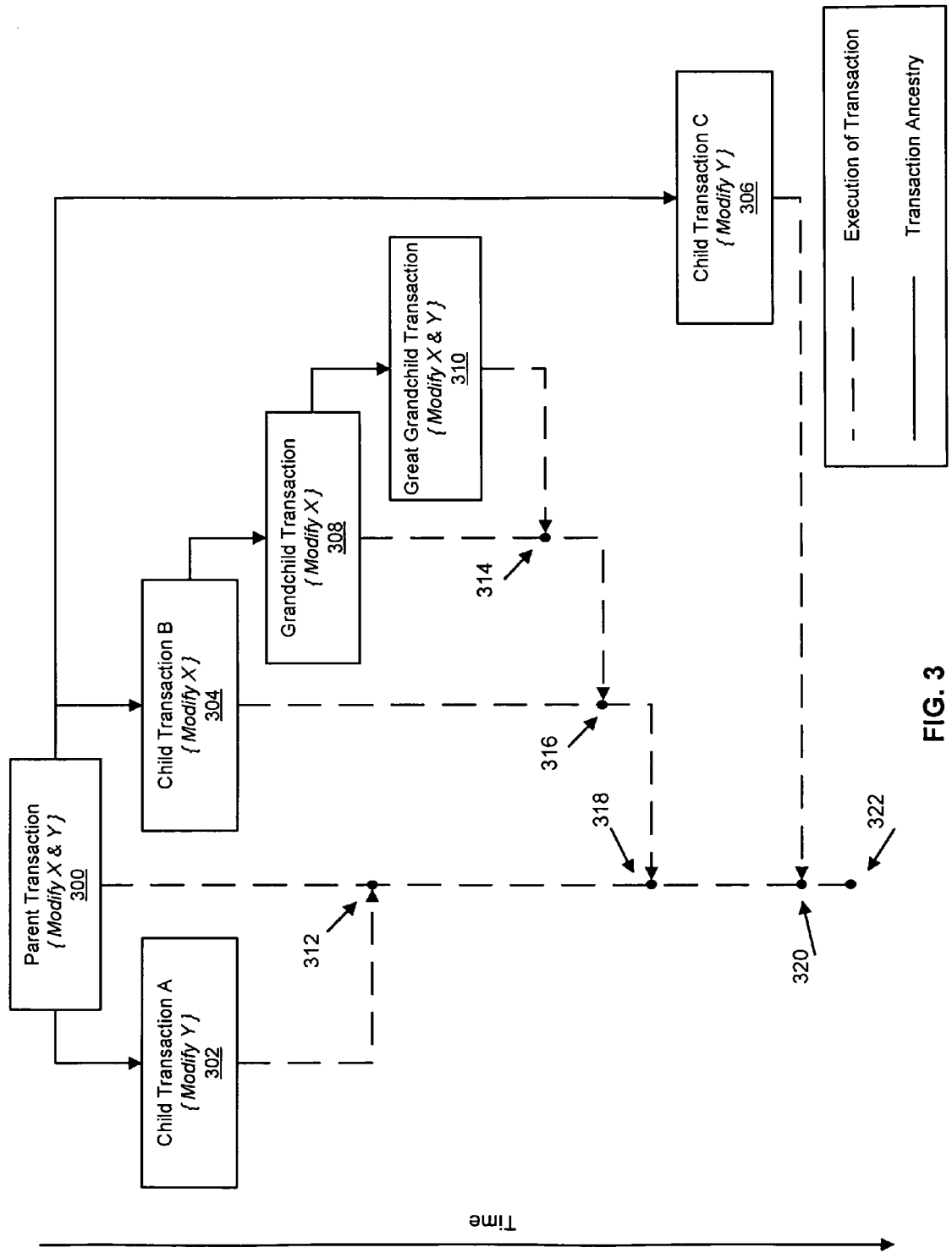
FIG. 3 shows the execution of nested atomic transactions in accordance with one or more embodiments of the invention.

FIG. 3 shows the parallel execution of nested atomic transactions in accordance with one or more embodiments of the invention. FIG. 3 includes a Parent Transaction (300), Child Transaction A (302), Child Transaction B (304), Child Transaction C (306), Grandchild Transaction (308), Great Grandchild Transaction (310), as well as commit points 312, 314, 316, 318, 320, and 322. Each of these elements will be described in more detail below.

In one or more embodiments of the invention, Parent Transaction (300) is an outer atomic transaction. Specifically, Parent Transaction (300) is an atomic transaction that modifies the variable X and the variable Y. It will be apparent to one of ordinary skill in the art that Parent Transaction (300) and all other transactions depicted in this example may modify any number of variables or memory locations, and that the invention should not be limited to the modifications of this example. As shown in FIG. 3, Parent Transaction (300) has three inner transactions: Child Transaction A (302), Child Transaction B (304), and Child Transaction C (306). Child Transaction A (302), Child Transaction B (304), and Child Transaction C (306) are nested within Parent Transaction B (304).

In one or more embodiments of the invention, Child Transaction A (302) executes in parallel with at least Parent Transaction (300). Because both Child Transaction A (302) and Parent Transaction (300) modify the variable Y, there may be a conflict. If the Parent Transaction (300) modifies Y first, then there is no conflict. However, if Child Transaction A (302) modifies Y first, or if the modifications from Parent Transaction (300) and Child Transaction A (302) are interleaved, then there may be a conflict. Any resulting conflict would be referred to the contention manager. As also shown in FIG. 3, Child Transaction C (306) modifies variable Y while executing in parallel with Parent Transaction (300). However, in one or more embodiments of the invention, because Child Transaction A (302) and Child Transaction C (306) are siblings (i.e., Child Transaction A (302) and Child Transaction C (306) are atomic transactions within the same level of the atomic transaction hierarchy), the use of a contention manager may be needed to determine which transaction gets to modify the variable Y first.

Child Transaction B (304) modifies variable X and includes nested Grandchild Transaction (308), which includes nested Great Grandchild Transaction (310). Even though Child Transaction B (304) and Parent Transaction (300) both modify the variable X, no conflict exists because Child Transaction B (304) is nested within Parent Transaction (300). Further, even though Grandchild Transaction (308) and Child Transaction B (304) both modify variable X, no conflict exists because Grandchild Transaction (308) is nested within Child Transaction B (304).

Lastly, Great-Grandchild Transaction (310) is nested within Grandchild Transaction (308), modifies the variables X and Y, and executes in parallel with all other transactions. Because Great-Grandchild Transaction (310) is nested within Grandchild Transaction (308) there is no conflict with respect to modifying variable X. However, because Great-Grandchild Transaction (310) and Child Transaction C (306) both modify variable Y, and because Great-Grandchild Transaction (310) is not nested within Child Transaction C (306), a conflict may exist to modify variable Y.

Additionally, FIG. 3 contains points 312, 314, 316, 318, 320, and 322. Each point represents the moment when a transaction commits to its parent, thereby making the variable updates made by the atomic transaction, and possibly the variable updates made by its nested atomic transactions, visible to its parent transaction. Specifically, point 312 is the moment when Child Transaction A (302) commits to Parent Transaction (300), thereby making its changes to variable Y visible to Parent Transaction (300). Point 314 is the moment when Great-Grandchild Transaction (310) commits to Grandchild Transaction (308), thereby making the changes to variable X and Y visible to Grandchild Transaction (308). Point 316 is the moment when Grandchild Transaction (308) commits to Child Transaction B (304), thereby making the changes to variable X, and possibly the changes made to variable X and Y by Great-Grandchild Transaction (310), visible to Child Transaction B (304). Point 318 is the moment when Child Transaction B (304) commits to Parent Transaction (300), thereby making its changes to variable X, and possibly the changes to variables X and Y made by its nested atomic transactions (304, 308, 310), visible to Parent Transaction (300). Point 320 is the moment when Child Transaction C (306) commits to Parent Transaction (300) thereby making the changes to variable Y visible to Parent Transaction (300). Point 322 is the moment when the parent transaction commits, thereby making the changes to variable X and Y visible to other atomic transactions and/or instructions.

Figure 4:
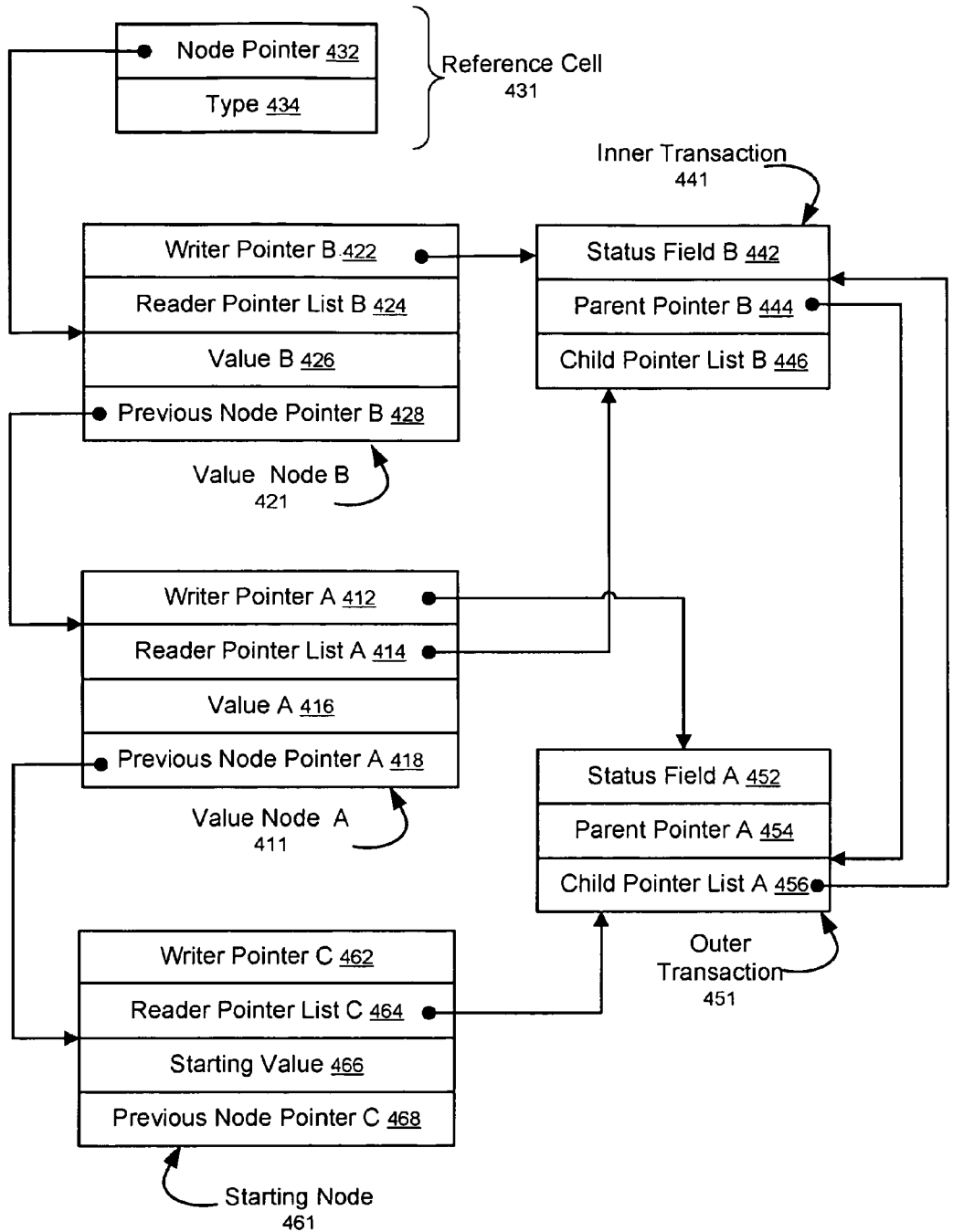
FIG. 4 shows data structures in accordance with one or more embodiments of the invention.

FIG. 4 shows one or more data structures for use in the parallel execution of nested atomic parallel transactions (e.g., an outer atomic transaction and an inner atomic transaction) in accordance with one or more embodiments of the invention. FIG. 4 includes a reference cell (431), an inner transaction (441), a value node B (421), a value node A (411), an outer transaction (451), and a starting node (461). It will be apparent to one of ordinary skill in the art that other structures may be used for executing nested atomic parallel transactions, and as such, the invention should not be limited to the structure depicted in FIG. 4. The individual components of FIG. 4 are described below.

A reference cell (431) represents a variable. When an atomic transaction wishes to access a variable, the variable is accessed through a reference cell even though the actual location of the variable may not be the same as the location of the reference cell. As shown in FIG. 4, a reference cell (431) includes a node pointer (432) and a type (434). The type (434) corresponds to the data type of the variable (e.g., integer, string, etc.). The node pointer (432) stores a pointer to a location where the value of reference cell (431) may be found. In FIG. 4, the node pointer (432) is pointing to value node B (421).

The value node B (421) includes a writer pointer B (422), a reader pointer list B (424), a value B (426), and a previous node pointer B (428). A value node (e.g., value node B (421)) is a data structure for storing a new value of a variable (i.e., the variable represented by reference cell (431)) written by an instruction of an atomic transaction. In one or more embodiments of the invention, the value nodes (e.g., value node B (421)) are stored in a stack-like manner. That is, value node B (421) is the most recent value of the variable. Value node A (411), which is connected to value node B (421) through the previous node pointer B (428) is an older value of the variable, and starting node (461), which is connected to value node A (411) through the previous node pointer A (418), is the starting value of the variable (i.e., the value of the variable when execution of the outer atomic transaction started). The inner transaction (441) comprises an instruction to write a value to the variable (i.e., the value associated with Value node B (421)). Accordingly, writer pointer B (422) stores a pointer referencing the inner transaction (441).

The inner transaction (441) includes a status field B (442), a parent pointer B (444), and a child pointer list B (446). The status field B (442) may be set to a status, such as Active, Committed, Orphaned, or Aborted. An active atomic transaction is an atomic transaction that is currently executing. A committed atomic transaction is an atomic transaction that already has its values visible to its parent transaction or at the top level. An orphaned atomic transaction is one whose parent has aborted. An aborted atomic transaction is one who has had its read or write set invalidated. In one or more embodiments of the invention, the possible transitions of a transaction between states include Active to Committed, Orphaned or Aborted, and Committed to Orphaned. In one or more embodiments of the invention, the parent pointer B (444) is a pointer for tracking the parent transaction (if applicable). The outer transaction is the parent of the inner transaction. Thus, the parent pointer B (444) points to the outer transaction (451). The child pointer list B (446) is a list of pointers for all child transactions. The inner transaction does not have any children. Accordingly, the child pointer list B (446) is null.

Returning to value node B (421), the reader pointer list B (424) is a list of pointers to all readers of value node B (421). This list is maintained so that, if an atomic transaction is aborted, all transactions based on the now-aborted value node may also be aborted. Value B (426) is the value of the reference cell (431) according to value node B (421). In other words, value B (426) is, for the purposes of FIG. 4, the most recent value of the reference cell (431). However, despite being the most recent value, value B (426) is not the actual value of the reference cell (431) until the transaction that wrote value B (426) commits. The previous node pointer B (428) points to the previous value node, in this case value node A (411).

Value node A (411) includes the same elements as value node B (421) such as the writer pointer A (412), the reader pointer list A (414), value A (416), and the previous node pointer A (418). The difference between value node A (411) and value node B (421) is that each element of the value node will likely store a different value or pointer. For example, the writer pointer A (412) stores a pointer referencing the outer transaction (451) because the outer transaction includes an instruction to write a value to the variable (i.e., the value associated with Value Node A (411)).

The outer transaction (451) includes the same elements as the inner transaction (441), such as the status field A (452), the parent pointer A (454), and the child pointer list A (456). The difference between the outer transaction (451) and the inner transaction (441) is that each element will likely store a different value or pointer. For example, as the inner transaction is a child transaction of the outer transaction, the child pointer list A (456) stores a pointer referencing the inner transaction (441).

The starting node (461) includes the same elements as both value node A (411) and value node B (421) such as a writer pointer C (462), a reader pointer list C (464), a starting value (466), and a previous node pointer C (468). However, these elements will have different values contained in them. The starting value (466) contains the starting value of the reference cell (431). If the reference cell (431) were to be accessed for its value before the inner and outer atomic transactions were completed, then the value of the reference cell (431) would be the value stored in starting value (466). Otherwise, if both the outer atomic transaction and the inner atomic transaction were successfully completed, the value of the reference cell (431) would be the value stored in Value B (426).

Figure 5:
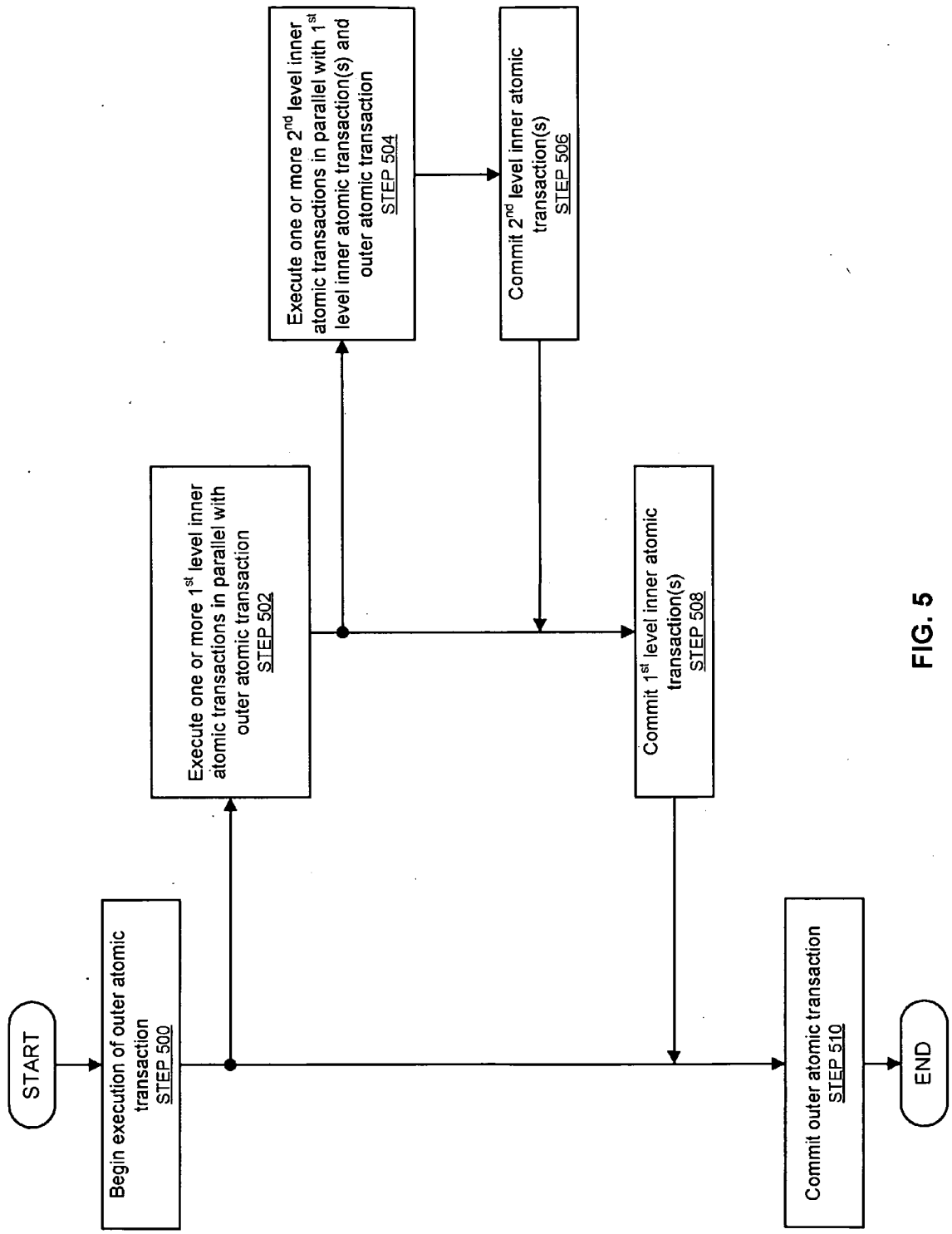
FIG. 5 shows a flowchart in accordance with one or more embodiments of the invention.

FIG. 5 shows a flowchart for the parallel execution of nested transactions in accordance with one or more embodiments of the invention. As discussed above, the parallel nested transactions may include instructions to access (i.e., read from and/or write to) the same variable. The method of FIG. 5 may be implemented, for example, using one or more aspects of the system(s) shown in FIG. 1, FIG. 2, FIG. 3, and FIG. 4. In one or more embodiments of the invention the steps of FIG. 5 may be executed in parallel. In one or more embodiments of the invention, one or more of the steps shown in FIG. 5 may be omitted, repeated, and/or preformed in a different order than the order shown in FIG. 5. Accordingly, the scope of the invention should not be considered limited to the specific arrangement of steps shown in FIG. 5.

Initially, execution of an outer atomic transaction begins (Step 500). As discussed above, the outer atomic transaction may include instructions to modify a variety of memory locations. Additionally, the outer atomic transaction may include multiple nested inner atomic transactions each having instructions to modify the same memory locations. In one or more embodiments of the invention, executing the outer atomic transaction includes executing an instruction within the outer atomic transaction to access a variable. Moreover, executing the instruction to access the variable includes identifying a reference cell containing a variable to be read or modified. In one or more embodiments of the invention, the reference cell includes two parts: a type and a pointer to a starting node having a starting value of the variable, a writer pointer, and a reader pointer list. The starting value may have been written to the variable by an atomic transaction or a non-transactional access.

In one or more embodiments of the invention, if the instruction to access the variable is a read instruction, the read instruction returns the starting value and updates the reader pointer list in the starting node to reference the outer atomic transaction. In one or more embodiments of the invention, if the instruction to access the variable is a write instruction, a new value node ("Value Node I") having a writer pointer referencing the outer atomic transaction, a reader pointer list, the value of the write instruction ("Value I"), and a previous node pointer referencing the starting node is created. Further, the pointer of the reference cell is set to reference Value Node I.

In Step 502, one or more $1^{st}$ level inner atomic transactions are executed in parallel with each other and the outer atomic transaction. As discussed above, at least one $1^{st}$ level inner atomic transaction includes an instruction to access the variable. In one or more embodiments of the invention, if the instruction to access the variable is a read instruction, the read instruction returns Value I and updates the reader pointer list in Value Node I to reference the inner atomic transaction. Further, the inner atomic transaction is updated to reference the outer atomic transaction as its parent atomic transaction. In addition, the outer atomic transaction is updated to reference the inner transaction node as its child atomic transaction.

In one or more embodiments of the invention, if the instruction to access the variable is a write instruction, a new value node ("Value Node II") having a writer pointer referencing the inner atomic transaction node, a reader pointer list, the value of the write instruction ("Value II"), and a previous node pointer referencing Value Node I is created. Further, the pointer node of the reference cell is set to reference Value Node II. Those skilled in the art, having the benefit of this detailed description, will appreciate that Value II may be based on Value I. In one or more embodiments of the invention, the inner atomic transaction may be executed by a thread different than the one executing the outer atomic transaction. Further, the two threads may be executed in parallel.

In Step 504, one or more $2^{nd}$ level inner atomic transaction are executed in parallel with the $1^{st}$ level inner atomic transactions and the outer atomic transaction. As discussed above, at least one $2^{nd}$ level inner atomic transaction may include an instruction to modify the variable. Moreover, execution of said instruction to modify the variable may be essentially the same as discussed above in reference to Step 502.

In Step 506, the $2^{nd}$ level inner atomic transactions are committed. The specifics for how transactions commit will be discussed in the next step when the $1^{st}$ level inner atomic transactions commit.

In Step 508, the $1^{st}$ level inner atomic transactions are committed. In one or more embodiments of the invention, committing a transaction is accomplished by setting the status field of the atomic transaction to committed. In one or more embodiments of the invention, the status field is set by a compare-and-swap operation (CAS). In one or more embodiments of the invention, the $1^{st}$ level inner atomic transaction commits to its parent transaction (i.e., the outer atomic transaction). In other words, by committing, the $1^{st}$ level inner atomic transaction makes its updates to the variable visible to its parent transaction.

In Step 510, the outer atomic transaction is committed. In one or more embodiments of the invention, this is accomplished by setting the status field of the outer atomic transaction node to committed (e.g., using a CAS operation). By committing the outer atomic transaction, updates to the variable performed by both the inner and outer atomic transactions are visible to other transactions. Accordingly, an attempt to read the variable after the outer transaction commits will return Value II (i.e., the last update to the variable performed by either the inner atomic transaction or the outer atomic transaction).

In one or more embodiments of the invention, after committing or aborting (discussed below) the atomic transactions, unnecessary value nodes are deleted. Unnecessary nodes may include, for example, nodes representing committed atomic transactions, aborted atomic transaction, and value nodes other than the value node referenced by the reference cell. It will be apparent to one of ordinary skill in the art that this is not an exhaustive list of nodes that potentially may be deleted. After this step is completed, the method ends.

In one or more embodiments of the invention, a conflicting atomic transaction may be accessing the reference cell when an attempt is being made to execute the outer atomic transaction. In such embodiments, a contention manager may be consulted to resolve which thread is to be granted access to the reference cell and which thread is to be prevented from accessing the reference cell. In the event the contention manager determines the outer atomic transaction is to be granted access to the reference cell, the conflicting transaction may be aborted and/or retried later. Further, in order to write to a variable, a new writer transaction (e.g., the inner atomic transaction, the outer atomic transaction) must obtain a writer token. In the event the previous writer transaction is a parent of the new writer transaction, the writer token is easily passed between generations (i.e., from a parent transaction to a child transaction). Otherwise, the new writer transaction may be considered a conflicting transaction with the previous writer transaction.

In one or more embodiments of the invention, the outer atomic transaction and the inner atomic transaction may be aborted by a non-transactional access attempting to write to the variable. In such embodiments, the status field of the outer atomic transaction node and the inner atomic transaction node are set to aborted and the necessary value node deletion operation is executed (discussed above). Further, once the non-transactional access is complete, an attempt may be made to retry the outer atomic transaction and the inner atomic transaction. Multiple attempts may be made until the outer atomic transaction and the inner transaction are successfully executed and committed.

FIGS. 6A-G show an example in accordance with one or more embodiments of the invention. Specifically, the example shows the process of writing new values to a reference cell. One of ordinary skill in the art will understand that this is only one example, and as such, the invention should not be limited to any specific steps, values, or structure that is included in the example.

Throughout FIGS. 6A-G the same reference numbers are used to refer to the same objects. Additionally, pseudo-code (650) is shown in the bottom right hand corner. The code is on the left of the box, and comments about what section that code relates to are on the right. For each figure, the corresponding pseudo-code segment is bolded and italicized, to indicate which step the current figure is showing. Further, all steps shown through FIGS. 6A-G may be occurring in parallel.

Figure 6A:
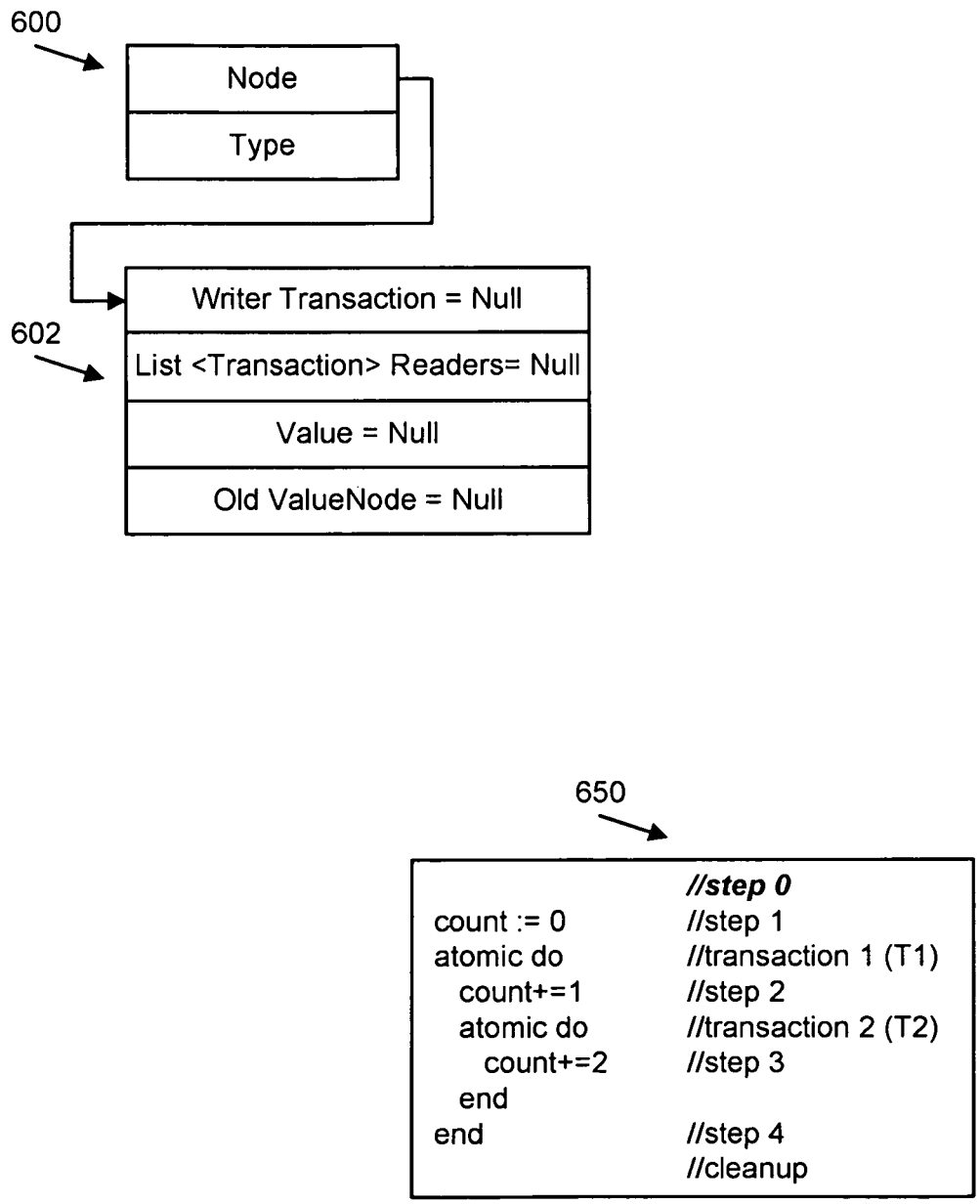
FIGS. 6A-6G show examples in accordance with one or more embodiments of the invention.

Initially, in FIG. 6A, a reference cell (600) and a value node (602) are created. A reference cell contains a pointer to a value node, and a type. A value node contains a pointer to a writer transaction, a list of reader transactions, a current value, and a pointer to the old value node. The values for the value node (602) are all null, because the value node (602) has just been initialized, and no values are written to it yet. Pseudo-code (650) indicates that this is step 0. Next, the example moves to FIG. 6B.

Figure 6B:
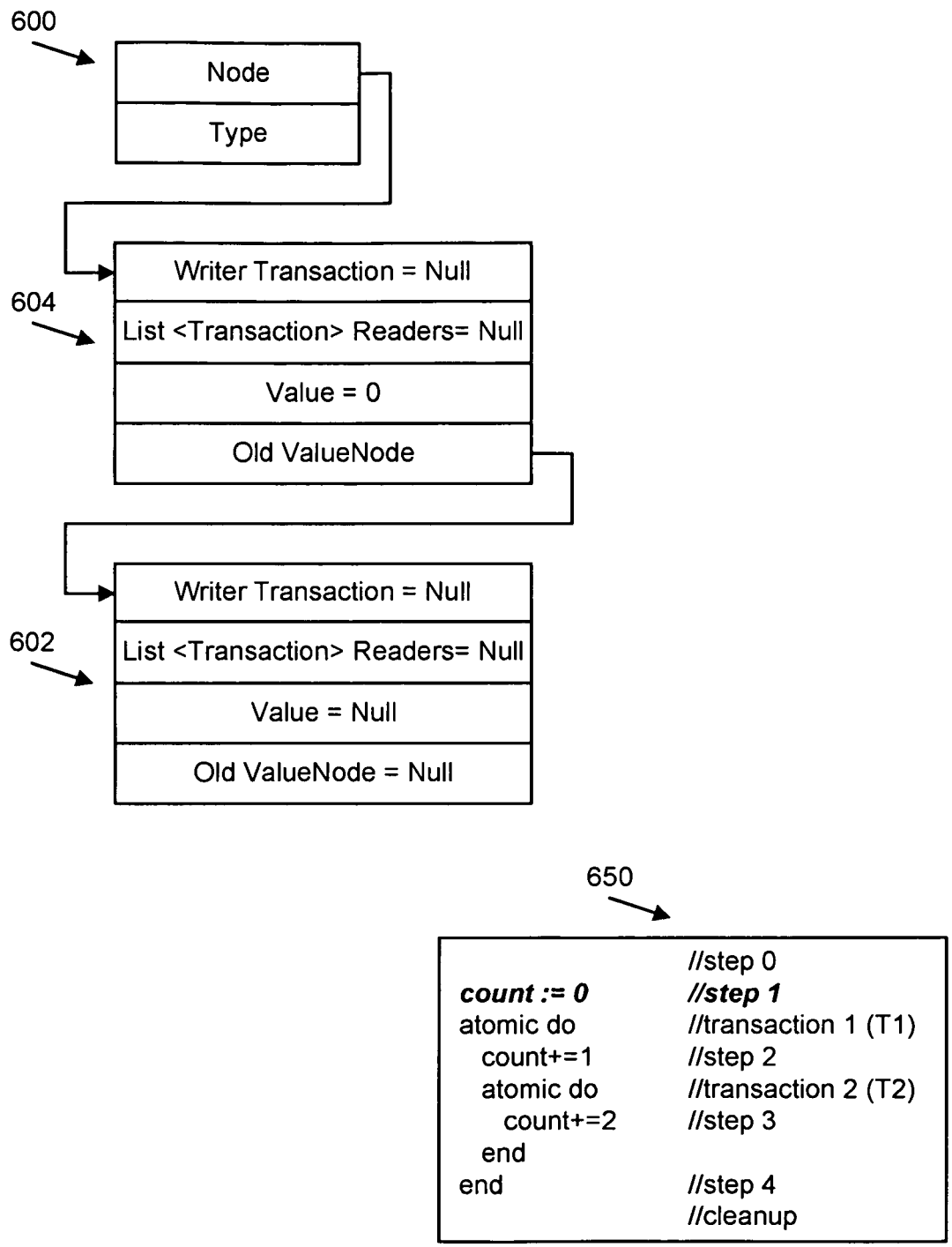

In FIG. 6B, count (i.e., the name of the variable stored in the reference cell) is set to 0. This is step 1 of the pseudo-code (650). In this example, setting count to 0 occurs from a non-transactional access. To do this, a new value node (604) is created. The new value node contains the new value of count, 0. Additionally, it contains a pointer to the old value node (602), which has the old value. As previously stated, there is no contention in this example, but if there was contention for access to count, then the contention may be resolved by a contention manager.

Figure 6C:
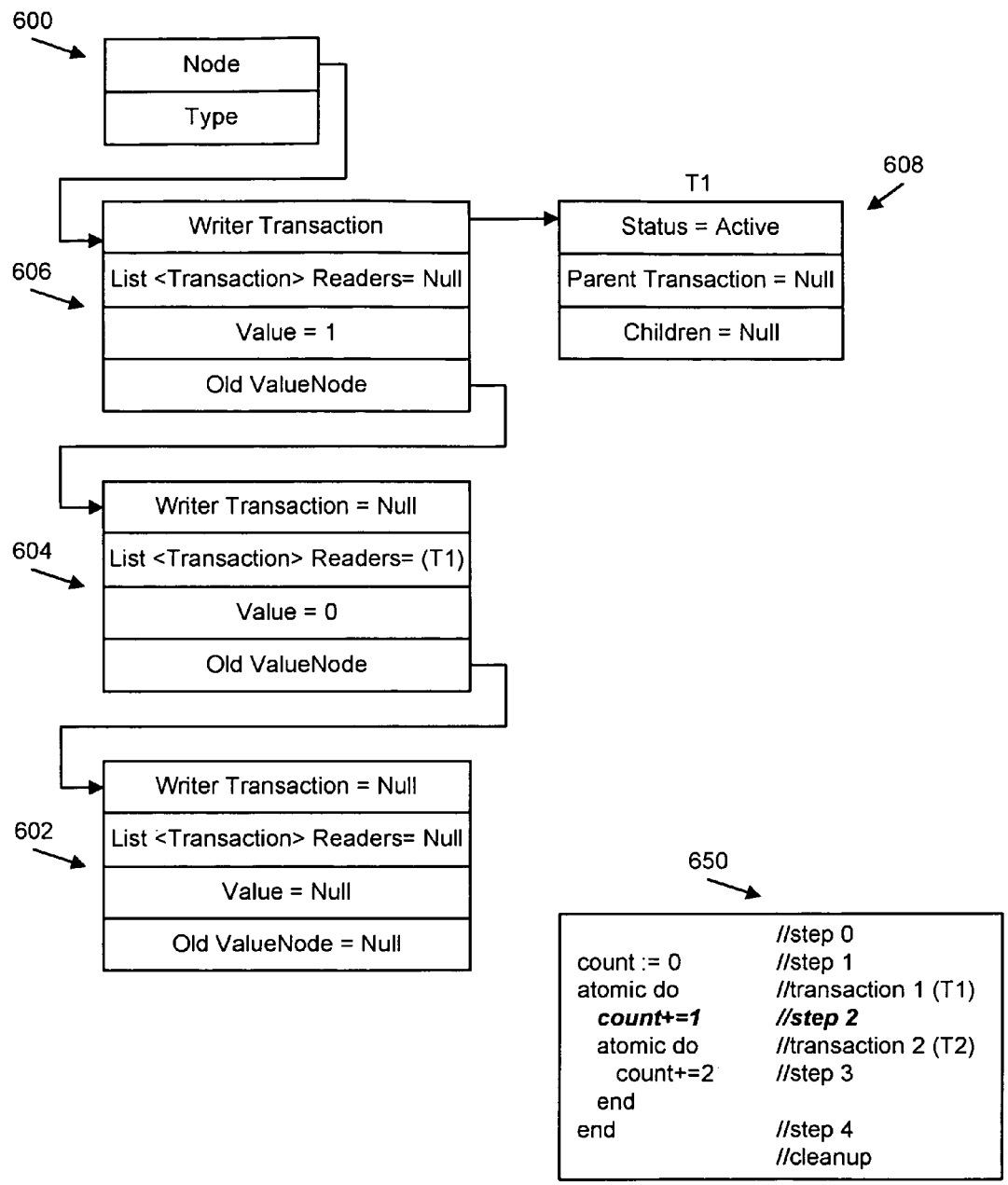

In FIG. 6C, the example has moved on to incrementing count by 1, as shown in the pseudo-code (650). This step is within atomic transaction T1. Accordingly, a new value node (606) is created. It contains the new value of count, 1, a pointer to the old value node (604), a pointer to the atomic transaction node T1 (608), and a list of reader transactions. The old value node (604) has had its list of reader transactions updated to reflect the fact that transaction 1 has read the value of count from it. A transaction node contains a status field, a list of pointers to child transactions, and a pointer to their parent transaction. Transaction node T1 (608) has its status field set to active, and the remaining values set to null.

Figure 6D:
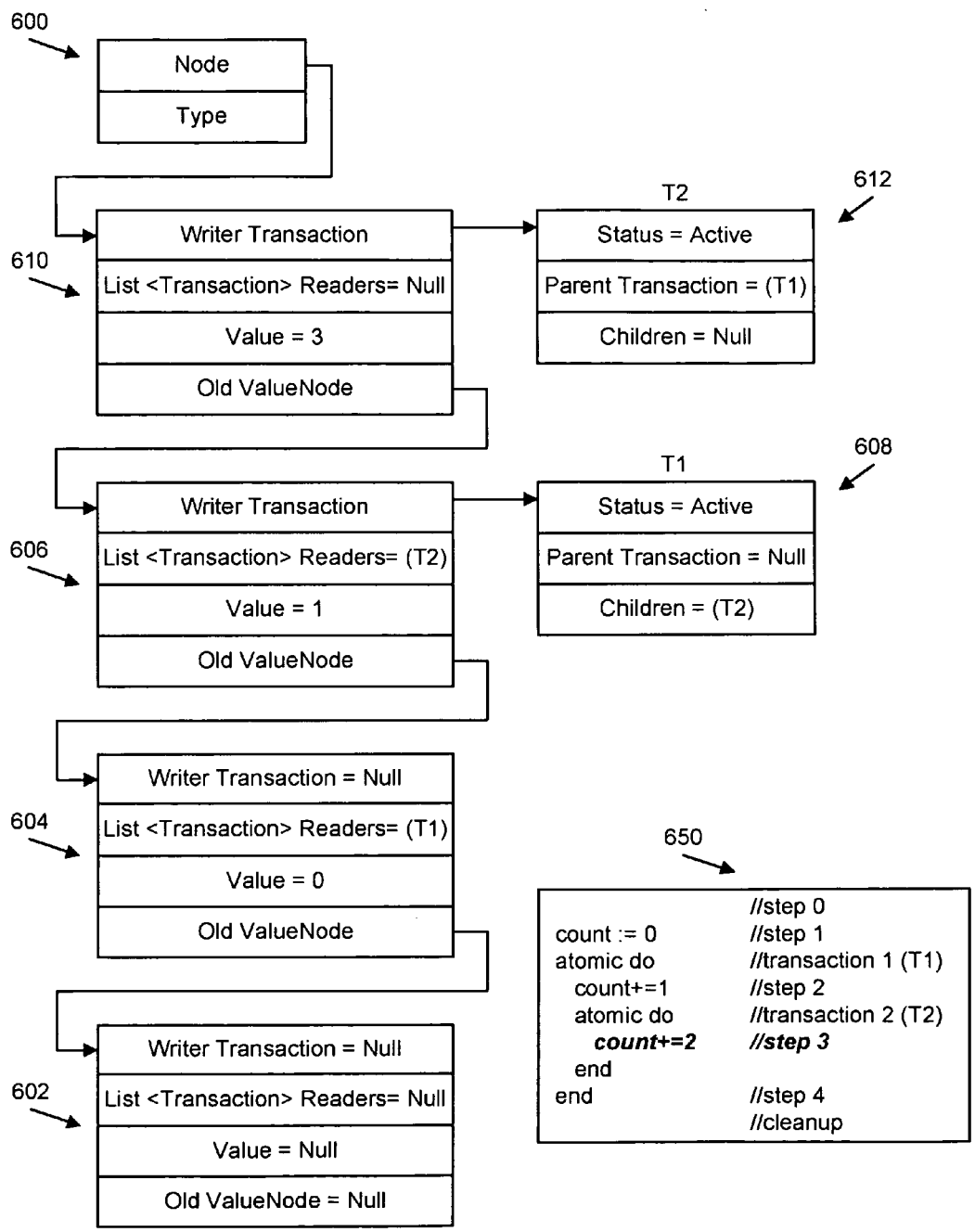

In FIG. 6D, the example has moved on to incrementing count by 2, as shown in the pseudo-code (650). This step is inside atomic transaction 2 (i.e., an inner transaction), which is nested inside transaction 1. Since this is an inner transaction, if for some reason it was aborted or otherwise forced to retry, the outer transaction (i.e., transaction 1) would not need to also be retried. Like the other steps, a new value node (610) is created. It contains the new value of count, 3, a pointer to the writer transaction (T2), and a pointer to the old value node (606). The old value node (606) has been updated to reflect the fact that transaction 2 has read the current value of the old value node (606). A new transaction node T2 (612) has also been created. It contains a status field set to active, and a pointer to its parent transaction T1 (608). Transaction node T1 (608) has been updated to show that transaction node T2 (612) is its child.

Figure 6E:
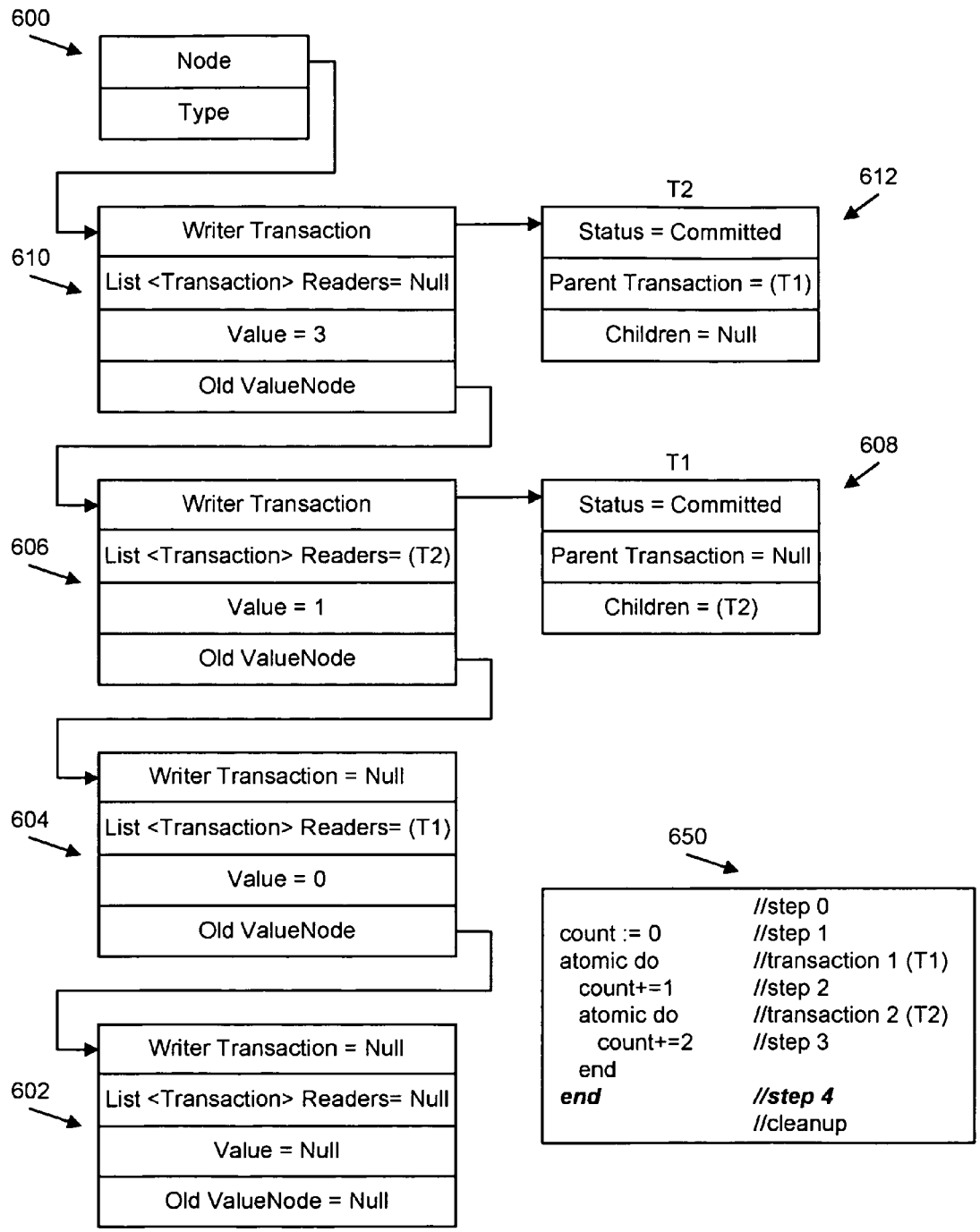

In FIG. 6E transactions 1 and 2 have completed, as shown in pseudo-code (650). Therefore, the transaction nodes commit. Specifically, transaction node T2 (612) commits to its parent transaction node T1 (608), which also commits. In one or more embodiments of the invention, the act of committing may be done through the use of a CAS operation. Through the process of committing, the value of count is updated. To a thread outside transaction 1, it will appear that the value of count was instantly updated to 3. That is, any thread outside of the transaction does not see the intermediate steps.

Figure 6F:
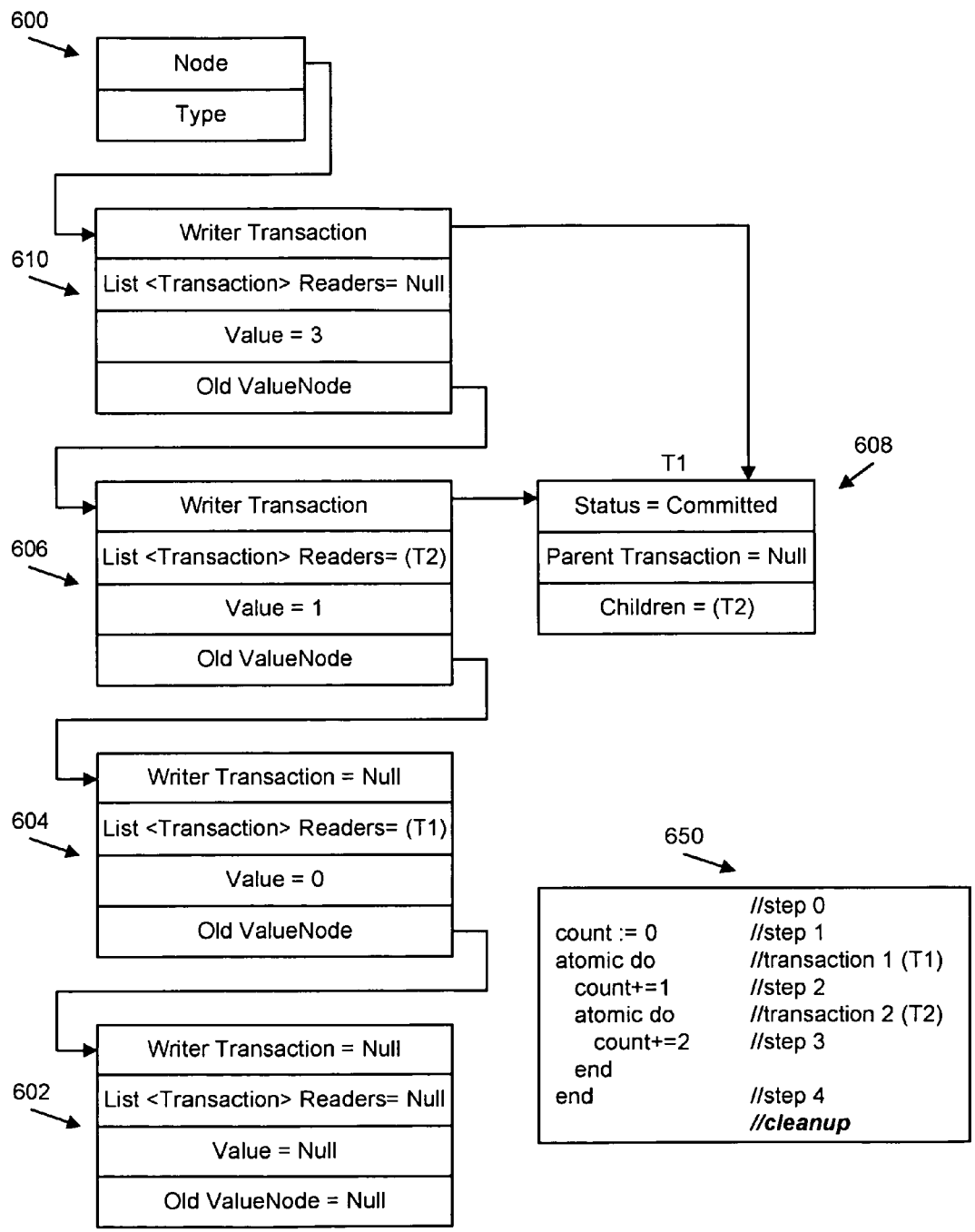

In FIG. 6F cleanup begins, as shown in the pseudo-code (650). In one or more embodiments of the invention, cleanup may occur in a different order or may utilize a different method. In this example, inactive transaction nodes are removed first. For this example, transaction node T2 (not shown) is deleted, and the pointer for the writer transaction of the value node (610) is set to the parent of transaction node T2 (not shown), transaction node T1 (608).

Figure 6G:
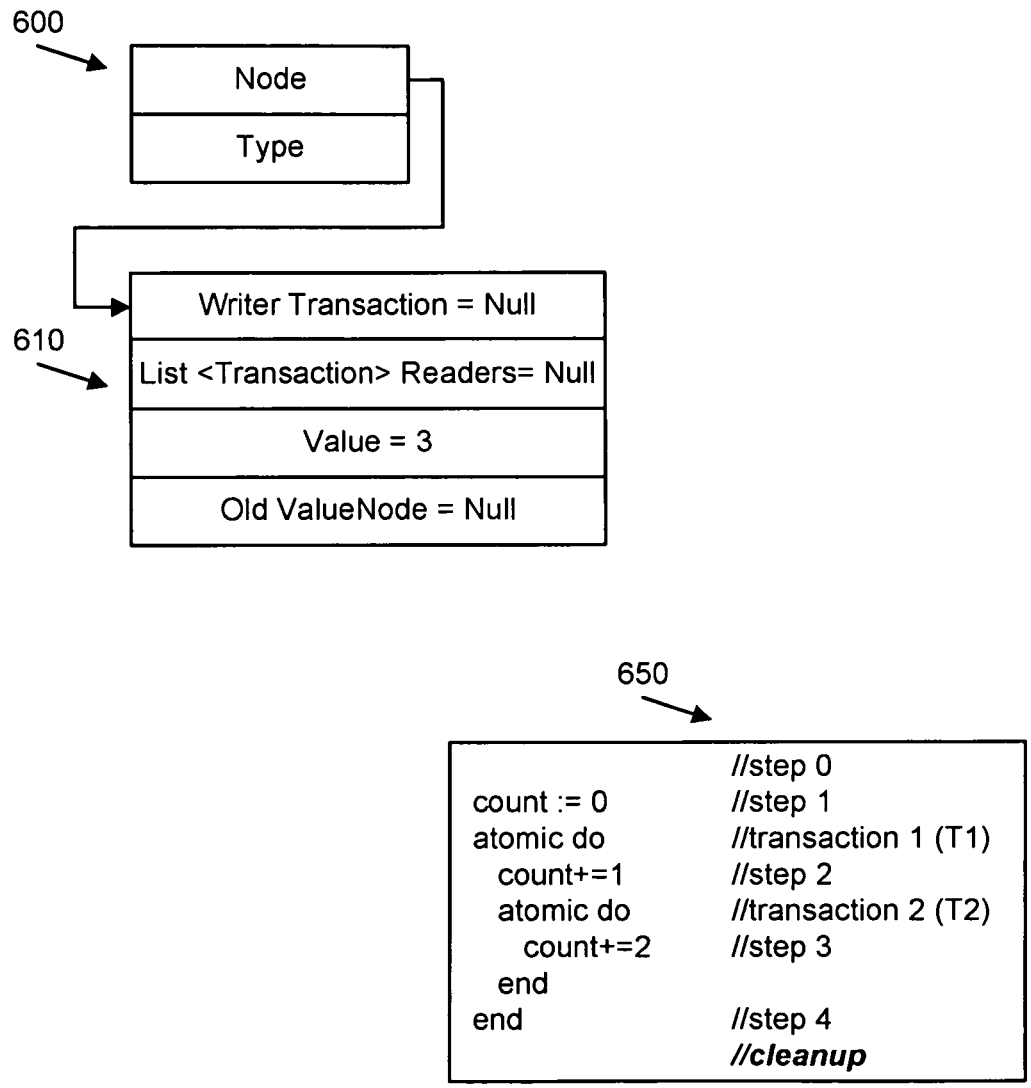

In FIG. 6G cleanup finishes, as shown in the pseudo-code (650). In one or more embodiments of the invention, cleanup may occur in a different order or may utilize a different method. In FIG. 6G, all value nodes that point to a committed transaction are removed, and the reference cell (600) is left pointing to an updated value node (610) which shows the current value of count as 3, and all other fields as null. This final state may be visible to all threads.

Figure 7:
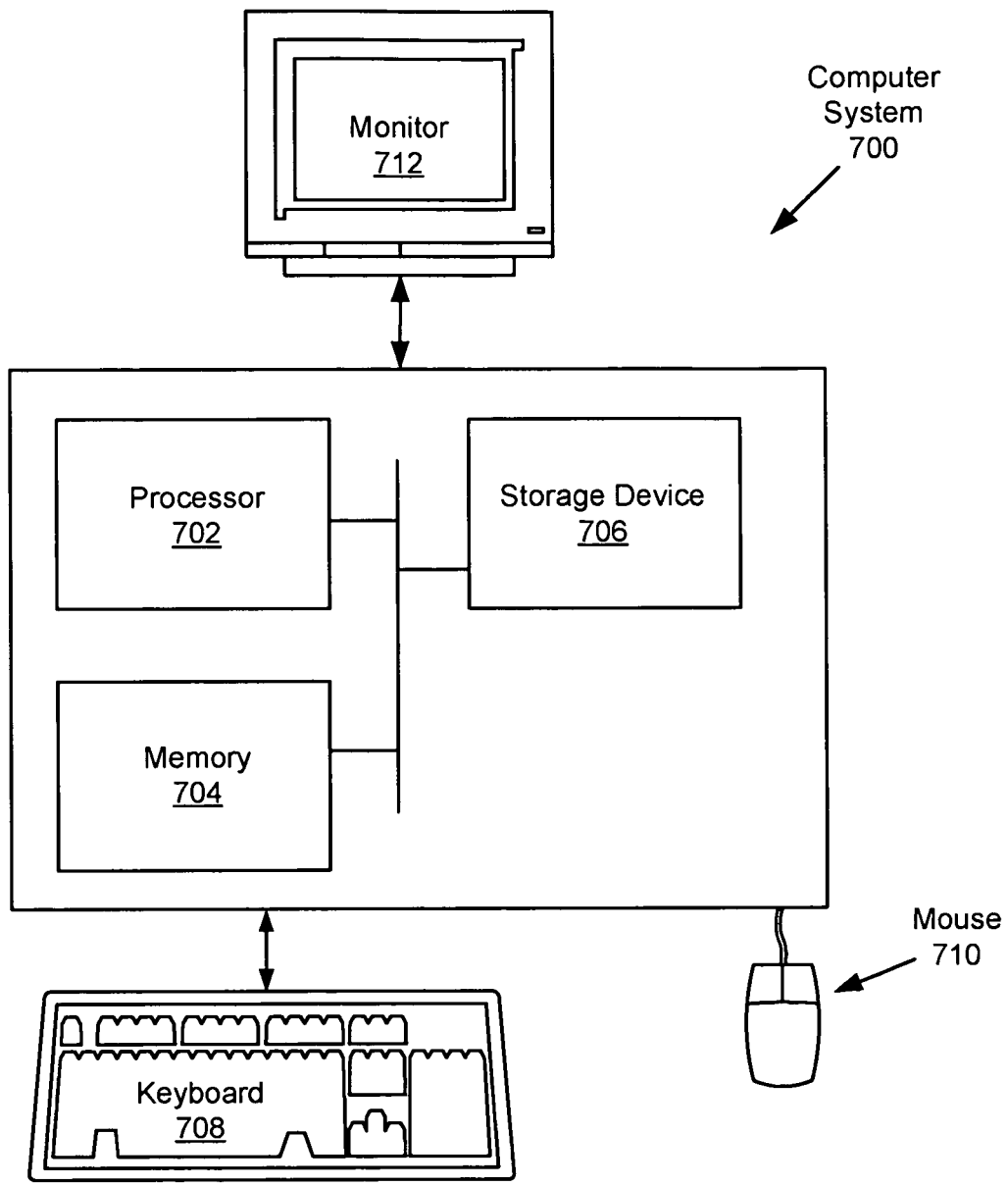
FIG. 7 shows a computer system in accordance with one or more embodiments of the invention.

The invention may be implemented on virtually any type of computing device regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, or any other suitable tangible computer readable storage device.

The implementation of transactional memory may provide for strong atomicity, embedded parallelism, and arbitrary nesting. Strong atomicity means that both transactional and non-transactional memory accesses may coexist. Embedded parallelism means that, within a transaction, multiple threads may execute the same transaction at the same time. Arbitrary nesting means that inner transactions may be retried without retrying the outer transaction. Additionally, in one or more embodiments of the invention, the environment in which the invention is implemented is a work stealing environment. Work stealing is a method of distributing work across many processors. Each core or processor may manage a dequeue, or other data structure, where it places tasks that are ready for execution. If one processor is idle it may "steal" a task from the dequeue of another processor. It will be apparent to one of ordinary skill in the art that there are many ways to manage or implement work stealing. Further, by tracking reads and writes on a per object basis, tasks may be packaged such that they may be stolen by other threads.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for managing transactions, comprising:
   a computer processor;
   a first thread executing on the computer processor and comprising an outer atomic transaction having a first instruction to write a first value to a first variable;
   a second thread, executing in parallel with the first thread, comprising an inner atomic transaction having a second instruction to write a second value to the first variable, wherein the inner atomic transaction is nested within the outer atomic transaction;
   a first value node created by the outer atomic transaction and storing the first value in response to execution of the first instruction;
   a second value node created by the inner atomic transaction, storing the second value in response to execution of the second instruction, and comprising a previous node pointer referencing the first value node; and
   a first reference cell associated with a starting value for the first variable, comprising a first node pointer, and configured to:
      receive a first request to read the first variable after the inner atomic transaction is committed and before the outer transaction is committed, and
      return the starting value in response to the first request,
   wherein the first node pointer references the first value node before creation of the second value node, and
   wherein the first node pointer references the second value node after creation of the second value node.

2. The system of claim 1, wherein the first value node comprises a first writer pointer referencing the outer atomic transaction, wherein the second value node further comprises a second writer pointer referencing the inner atomic transaction, and wherein the second writer pointer references the outer atomic transaction after the inner atomic transaction is committed.

3. The system of claim 2, wherein the second instruction includes a read of the first variable, wherein the second value is based on the first value, and wherein the first value node comprises a reader pointer referencing the inner atomic transaction.

4. The system of claim 1, wherein the outer atomic transaction is executed on a plurality of threads, and wherein the plurality of threads includes the first thread.

5. The system of claim 1, wherein the first reference cell is further configured to:
   receive a second request to read the first variable after the outer atomic transaction and the inner atomic transaction are committed, and
   return the second value in response to the second request.

6. The system of claim 1, further comprising:
   a second reference cell associated with a second variable, wherein the outer atomic transaction comprises a third instruction to write a third value to the second variable; and a third value node, created by the outer atomic transaction, comprising the third value and a writer pointer referencing the outer atomic transaction in response to execution of the third instruction, wherein the second reference cell comprises a second node pointer referencing the third value node.

7. The system of claim 1, further comprising:

a writer token associated with the first reference cell, wherein the outer atomic transaction acquires the writer token to write the first value to the first variable, and wherein the inner atomic transaction acquires the writer token from the outer atomic transaction to write the second value to the first variable.

8. The system of claim 1, further comprising:

a third thread comprising a conflicting third atomic transaction, wherein the third atomic transaction comprises a third instruction to write a third value to the first variable; and a contention manager configured to prevent the third thread from executing before the outer atomic transaction is committed.

9. A method for managing transactions, comprising:

executing, by a computer processor, an outer atomic transaction comprising a first instruction to write a first value to a first variable, wherein the outer atomic transaction is part of a first thread;

creating, during execution of the outer atomic transaction, a first value node storing the first value and comprising a reader pointer and first writer pointer referencing the outer atomic transaction;

setting a node pointer of a reference cell associated with the first variable to reference the first value node;

executing, in parallel with the outer atomic transaction, an inner atomic transaction comprising a second instruction to write a second value to the first variable, wherein the inner atomic transaction is nested within the outer atomic transaction, and wherein the inner atomic transaction is part of a second thread;

creating, during execution of the inner atomic transaction, a second value node storing the second value and comprising a second writer pointer referencing the inner atomic transaction, and a previous node pointer referencing the first value node;

setting, after creating the second value node, the node pointer of the reference cell to reference the second value node, wherein the node pointer references the first value node before creating the second value node;

setting the reader pointer of the first value node to reference the inner atomic transaction, wherein the second instruction includes a read of the first variable;

committing the inner atomic transaction, wherein the first value is visible to the outer atomic transaction after committing the inner atomic transaction; and committing the outer atomic transaction after committing the inner atomic transaction.

10. The method of claim 9, further comprising:

receiving, at the reference cell after committing the inner atomic transaction and before committing the outer atomic transaction, a first request to read the first variable;

sending, in response to the first request, a staring value of the first variable, wherein the first variable equals the starting value before executing the outer atomic transaction;

receiving, at the reference cell after committing the outer atomic transaction, a second request to read the first variable; and sending, in response to the second request, the second value.

11. The method of claim 9, further comprising:

aborting, using a contention manager and before executing the first thread, a conflicting atomic transaction comprising a third instruction to access the first variable.

12. The method of claim 9, wherein executing the outer atomic transaction comprises obtaining a writer token associated with the first reference cell, and wherein executing the inner transaction comprises obtaining the writer token from the outer atomic transaction.

13. The method of claim 9, wherein executing the outer atomic transaction comprises:

executing a third instruction to write a third value to a second variable before committing the outer atomic transaction, wherein the outer atomic transaction includes the third instruction, and wherein committing the outer atomic transaction commits the third value to the second variable.

14. A method for managing transactions, comprising:

executing, by a computer processor, an outer atomic transaction comprising a first instruction associated with a variable, wherein the outer atomic transaction is part of a first thread;

executing, in parallel with the outer atomic transaction, an inner atomic transaction comprising a second instruction associated with the variable, wherein the inner atomic transaction is part of a second thread, and wherein the inner atomic transaction is nested within the outer atomic transaction;

aborting execution of the inner atomic transaction and the outer atomic transaction to execute a non-transactional access, wherein the non-transactional access comprises a third instruction to write a starting value to the variable;

executing the first thread and the second thread after executing the non-transactional access, wherein the first instruction comprises reading the starting value from the variable and writing a first value based on the starting value to the variable, and wherein the second instruction comprises writing a second value to the variable;

creating, during execution of the outer atomic transaction, a first value node storing the first value and comprising a reader pointer and first writer pointer referencing the outer atomic transaction;

setting a node pointer of a reference cell associated with the variable to reference the first value node;

creating, during execution of the inner atomic transaction, a second value node storing the second value and comprising a second writer pointer referencing the inner atomic transaction, and a previous node pointer referencing the first value node;

setting the node pointer of the reference cell to reference the second value node, wherein the node pointer references the first value node before creating the second value node;

setting the reader pointer of the first value node to reference the inner atomic transaction, wherein the second instruction includes a read of the variable;

committing the inner atomic transaction, wherein the second value is visible to the outer atomic transaction after committing the inner atomic transaction; and committing the outer atomic transaction after committing the inner atomic transaction.

15. The method of claim 14, further comprising:
receiving a first request to read the variable after committing the inner atomic transaction and before committing the outer atomic transaction;
sending, in response to the first request, the starting value;
receiving a second request to read the variable after committing the outer atomic transaction; and
sending, in response to the second request, the second value.

* * * * *